United States Patent [19]
Tsutsumi

[11] Patent Number: 5,829,699
[45] Date of Patent: Nov. 3, 1998

[54] FISHING SPINNING REEL HAVING A SPOOL RECIPROCATING MECHANISM

[75] Inventor: Wataru Tsutsumi, Saitama, Japan

[73] Assignee: Daiwa Seiko, Inc., Tokyo, Japan

[21] Appl. No.: 813,051

[22] Filed: Mar. 7, 1997

[30] Foreign Application Priority Data

Mar. 13, 1996 [JP] Japan ................................. 8-056056

[51] Int. Cl.⁶ .................................................. A01K 89/01
[52] U.S. Cl. ........................................ 242/241; 242/322
[58] Field of Search ............................ 242/241, 242, 242/322

[56] References Cited

U.S. PATENT DOCUMENTS

| | | | |
|---|---|---|---|
| 4,339,095 | 7/1982 | Gifford | 242/242 |
| 5,232,181 | 8/1993 | Fujine | 242/241 |
| 5,427,324 | 6/1995 | Kawashiro | 242/241 |
| 5,431,354 | 7/1995 | Hitomi | 242/241 |

FOREIGN PATENT DOCUMENTS 4-1806  1/1992  Japan .

*Primary Examiner*—Katherine Matecki
*Attorney, Agent, or Firm*—Sughrue, Mion, Zinn, Macpeak & Seas, PLLC

[57] ABSTRACT

In a fishing spinning reel comprising a spool reciprocating mechanism adapted to convert rotation of the handle into linear reciprocating motion of the spool shaft, a non-circular part of the rear end portion of the spool shaft is locked to a slider of the spool reciprocating mechanism in such a manner that the non-circular part confronts the handle shaft. The spool shaft is non-rotatably retained, and a gap between the handle shaft and the spool shaft is minimized, whereby the reel body is decreased in size and in weight relative to conventional reels. Also transmission efficiency of transmitting drive power provided by the rotation of the handle is improved.

4 Claims, 5 Drawing Sheets

5,829,699

FISHING SPINNING REEL HAVING A SPOOL RECIPROCATING MECHANISM

BACKGROUND OF THE INVENTION

1. Field of the Invention

This invention relates to an improvement of a fishing spinning reel. More particularly, the invention relates to an improved spool reciprocating mechanism of a spinning reel.

2. Description of the Related Art

In a conventional fishing spinning reel, a rotor having a fishing line guide is rotated in association with the rotation of the handle to move the spool back and forth, thereby to wind the fishing line on the spool uniformly. The rotor is turned through a pinion engaged with a drive gear mounted on the handle shaft, and the spool is moved back and forth with a spool reciprocating mechanism.

The spool reciprocating mechanism is designed as follows: As disclosed, for instance, by Japanese Utility Model Examined Application No. Hei. 4-1806, a slider, which is coupled to the spool shaft in such a manner that its rotation around the spool shaft is inhibited, is engaged with a worm shaft on which a gear engaged with the pinion is mounted. Hence, as the worm shaft rotates, the slider is moved back and forth, thereby to reciprocate the spool.

In the conventional spool reciprocating mechanism, the slider engages with a semi-circular slot formed in the rear portion of the spool shaft, and is fixed thereto with the aid of a retaining board and a screw. More specifically, the slider has a semi-circular groove corresponding in shape to the slot of the spool shaft, and has an engaging hole adjacent the semi-circular groove for receiving an engaging pin that engages with the worm. The slot of the spool shaft is disposed within the semi-circular groove, and the retaining board is set to prevent removal of the engaging pin, and those two parts are fixed with the screw.

In the above-described conventional spool reciprocating mechanism, the spool shaft is designed as follows: That is, the semi-circular slot of the spool shaft is fixed with respect to the slider so that the main surface of the semi-circular slot lies in a direction perpendicular to the handle shaft. Hence, a protrusion (a thick wall portion accommodating the semi-circular groove) of the slider is confronted with the handle shaft, and thus the distance between the handle shaft and the spool shaft must be set large as a result of which the reel body is bulky and heavy. Furthermore the larger the distance between the handle shaft and the spool shaft the larger the angle between (1) the straight line connecting the engaging point of the drive gear with a pinion provided on the spool shaft to the central point of the drive gear and (2) the straight line formed by the central axis of the pinion. Consequently, power transmission efficiency from the drive gear to the pinion is lowered.

SUMMARY OF THE INVENTION

In view of the foregoing, an object of the invention is to provide a fishing spinning reel with a spool reciprocating mechanism in which the reel body is reduced both in size and in which in weight, and the power transmission efficiency from the drive gear to the pinion is improved.

The foregoing object and other objects of the invention have been achieved by the provision of a fishing spinning reel having a handle shaft with a handle, a spool shaft in which a non-circular part defining a flat surface is formed at one end thereof and a spool is attached to another end thereof, and a spool reciprocating mechanism with a slider which converts the rotation of the handle shaft into a liner reciprocating motion of the spool shaft, wherein the slider is non-rotatably retained to the non-circular part of the spool shaft through the flat surface elongated substantially parallel with an axis of the handle shaft.

The spool shaft is in the form of a circular cylinder; however, its fixing part is not circular in section so that the spool shaft is coupled to the slider of the reciprocating mechanism in such as manner that it is not turned. This non-circular part is fixed to the slider in such a manner that the flat surface of the non-circular part is substantially parallel to the axis of the handle shaft. Hence, the thick wall portion of the slider around the non-circular part can be disposed so as not to confront the handle shaft, and the spool shaft is brought close to the handle shaft by a corresponding amount.

BRIEF DESCRIPTION OF THE DRAWINGS

The nature, utility and principle of the invention will be more clearly understood from the following detailed description and the appended claims when read in conjunction with the accompanying drawing. In the accompanying drawings:

DETAILED DESCRIPTION OF THE INVENTION

Figure 1:
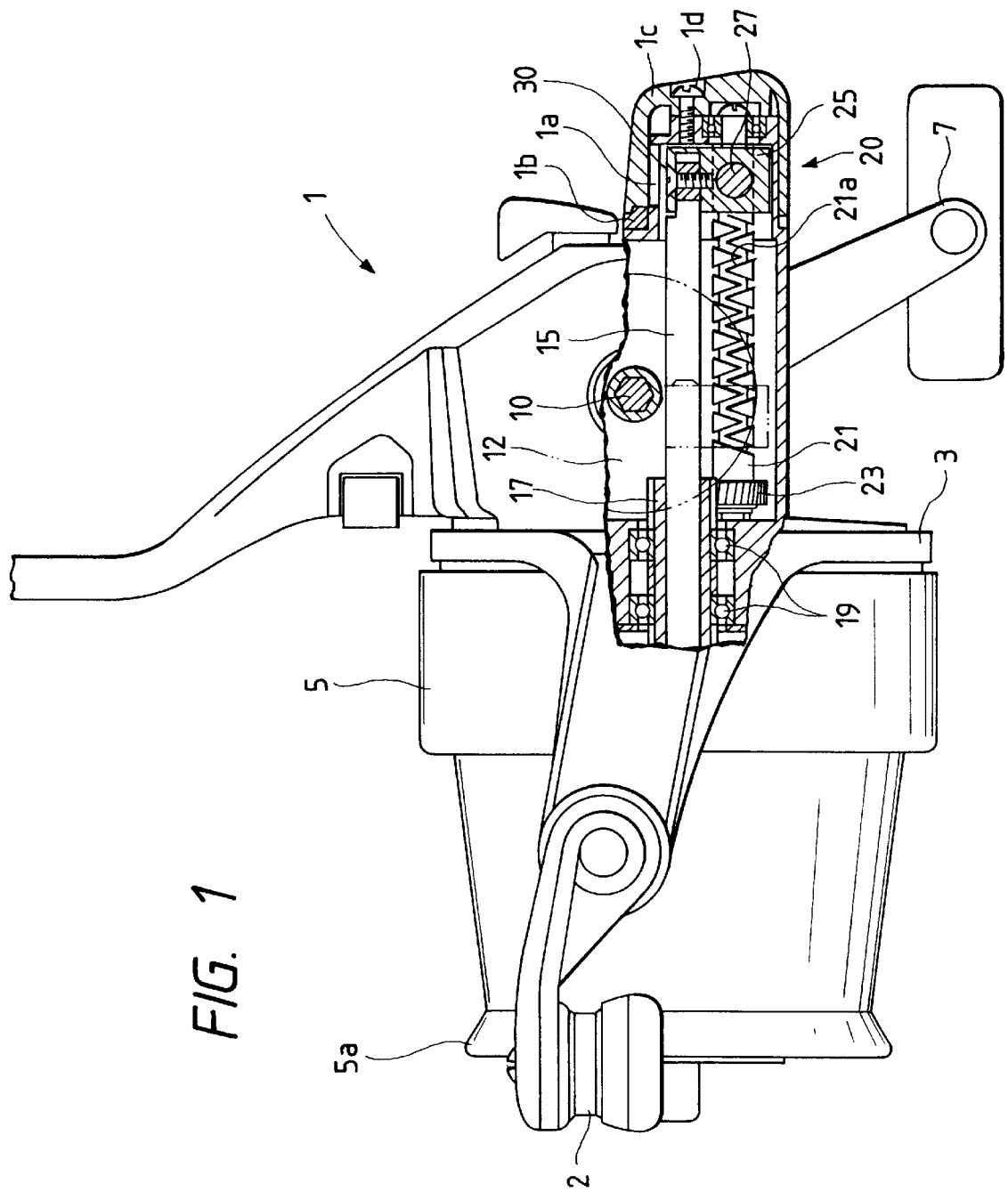
FIG. 1 is a diagram showing an example of a fishing spinning reel according to the invention, with parts of a spool reciprocating mechanism therein cut away.
Figure 2:
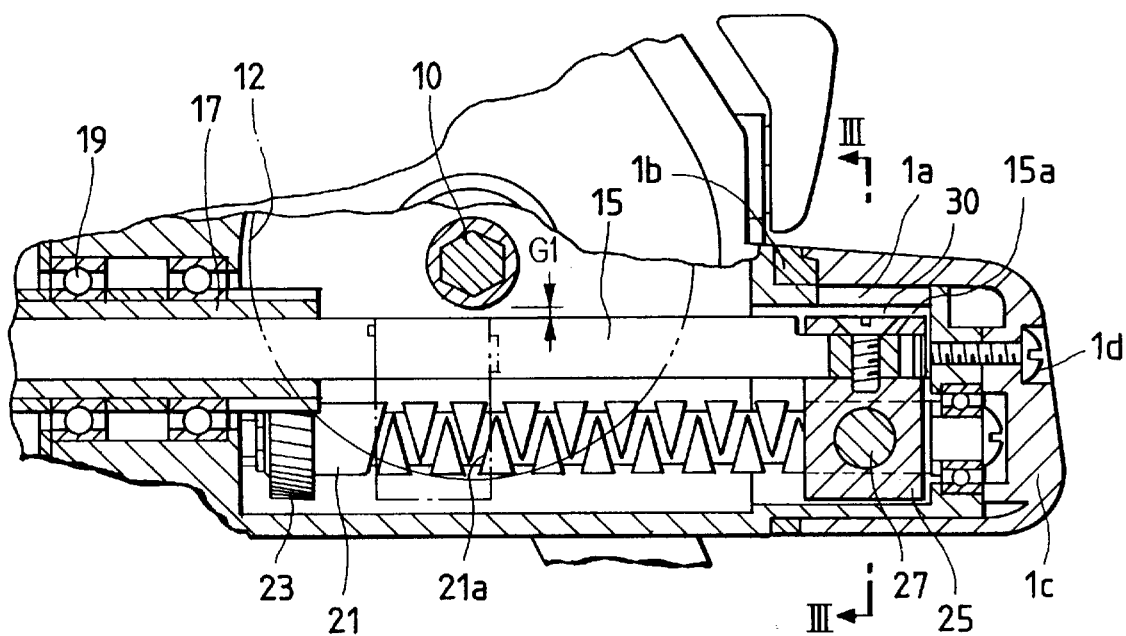
FIG. 2 is an enlarged diagram of components of the spool reciprocating mechanism shown in FIG. 1.

A fishing spinning reel according to one preferred embodiment of the invention will be described with reference to the accompanying drawings.

As shown in those drawings, a spinning reel body 1 includes: a rotor 3 with a fishing line guide 2; and a spool 5 which is coaxial with the rotor 3 and on which a fishing line is wound. Hence, as the spool 5 is reciprocated (moved back and forth), the fishing line is uniformly wound on the spool 5 through the fishing line guide. The rotor 3, and the spool 5, as described later in detail, are driven by turning a handle 7 coupled to the reel body 1.

In the reel body 1, a handle shaft 10 on which the handle 7 is mounted extends laterally. A drive gear 12 is mounted on the handle shaft 10 so that it cannot rotate relative to the shaft 10. Below the handle shaft 10, a spool shaft 15 extends in such a manner that it is perpendicular to the handle shaft 10. The spool shaft 15 has the spool 5 mounted at one end.

The spool shaft 15 is inserted into a pinion 17 for the rotor 3 in such a manner that the shaft 15 is movable back and forth.

The pinion 17 is engaged with the drive gear 12. As the drive gear 12 is turned with the handle 7, the rotor 3 coupled to the pinion 17 turns. The pinion 17 is rotatably supported through bearings 19 at two positions forwardly of the engaging portion, and the stroke of the spool shaft 15 by a spool reciprocating mechanism 20 (described later) is set large.

The reciprocating mechanism 20 includes: a traverse cam shaft 21 which extends in parallel with the spool shaft 15 and is rotatably supported; an idle gear 23 which is set behind the rotatably supported, forward portion of the traverse cam shaft 21, and engages with the pinion 17; and a slider 25 which is engaged with a traverse groove 21*a* formed in the traverse cam shaft 21 and which is non-rotatably coupled to the rear portion of the spool shaft 15.

Figure 3:
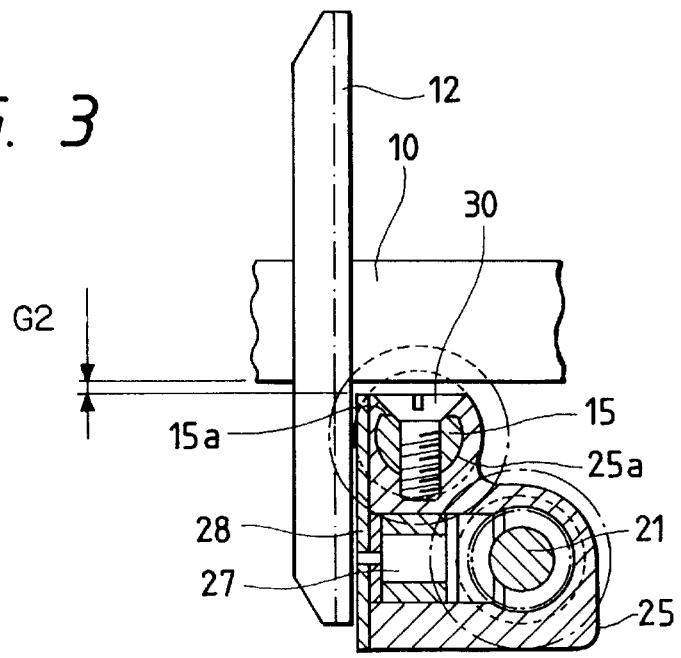
FIG. 3 is a sectional diagram taken along line III—III in FIG. 2.

The traverse shaft 21 is rotatably inserted into the slider 25. The slider 25 has an engaging pin 27 which engages with the traverse groove 21*a* in a direction parallel with the handle shaft 10. A retaining plate 28 is fitted on the engaging pin 27 so as to prevent removal of the engaging pin. Furthermore, the slider 25 has an engaging portion 25*a* with which a non-circular part 15*a* of the rear portion of the spool shaft 15 is engaged in such a way as to prevent the rotation of the spool shaft 15. In the embodiment shown, the non-circular part 15*a* of the spool shaft 15 is substantially semi-circular in section, having a flat surface. In order that the rotation of the spool shaft 15 is prevented with the flat surface of the non-circular part 15 confronting the handle shaft 10, the engaging portion 25*a* is provided as a groove which opens towards the handle shaft 10 and is semi-circular in section. More specifically, as shown in FIG. 3, the plane including the aforementioned flat surface is in parallel with the axis of the handle shaft 10, and the non-circular part 15*a* of the spool shaft 15, which is engaged with the semi-circular engaging portion 25*a* is fixedly secured to the slider 25 with a screw 30 screwed in the flat surface.

The conventional spool shaft is secured to the slider with the surface of the non-circular part being perpendicular to the handle shaft, and therefore the wall of the slider which is adapted to engage with the non-circular part makes it impossible to set the spool shaft and the handle shaft close to each other. In contrast, in the embodiment, the gap G1 between the spool shaft 15 and the handle shaft 10 is minimized; that is, the spool shaft 15 is set close to the handle shaft 10. As a result, the vertical dimension of the reel body 1 is reduced, and the weight of the reel is decreased by a corresponding amount. Furthermore, the straight line connecting the engaging point of the drive gear 12 with the pinion 17 on the spool shaft 15 to the central point of the drive gear 12 forms a small angle with respect to the central axis of the pinion 17. This feature improves the power transmission efficiency from the drive gear 12 to the pinion 17.

Figure 4:
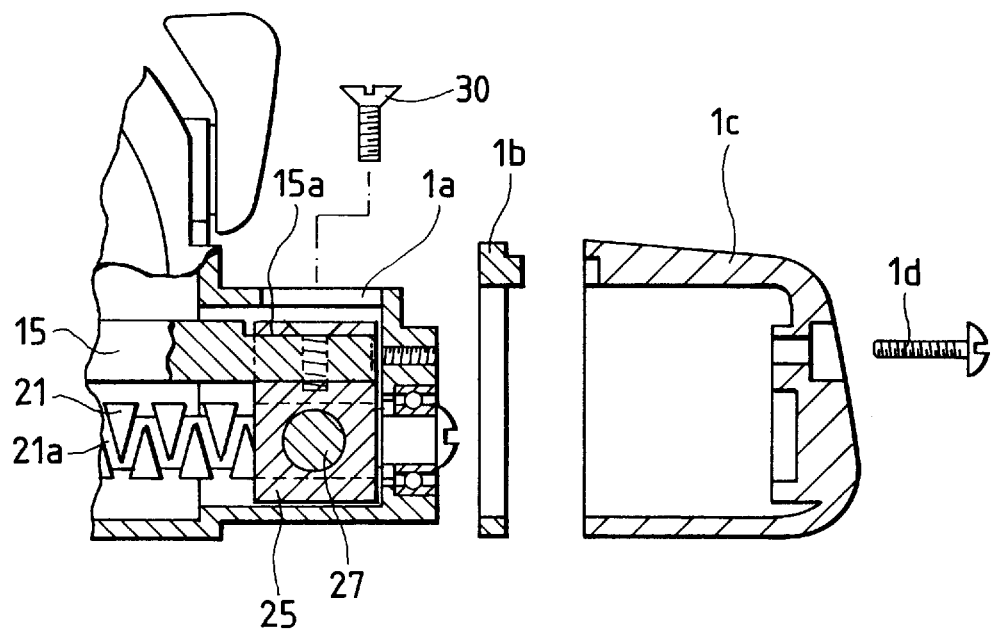
FIG. 4 is a diagram for a description of an example of a method for fixing a spool shaft to a slider in the spool reciprocating mechanism.
Figure 5:
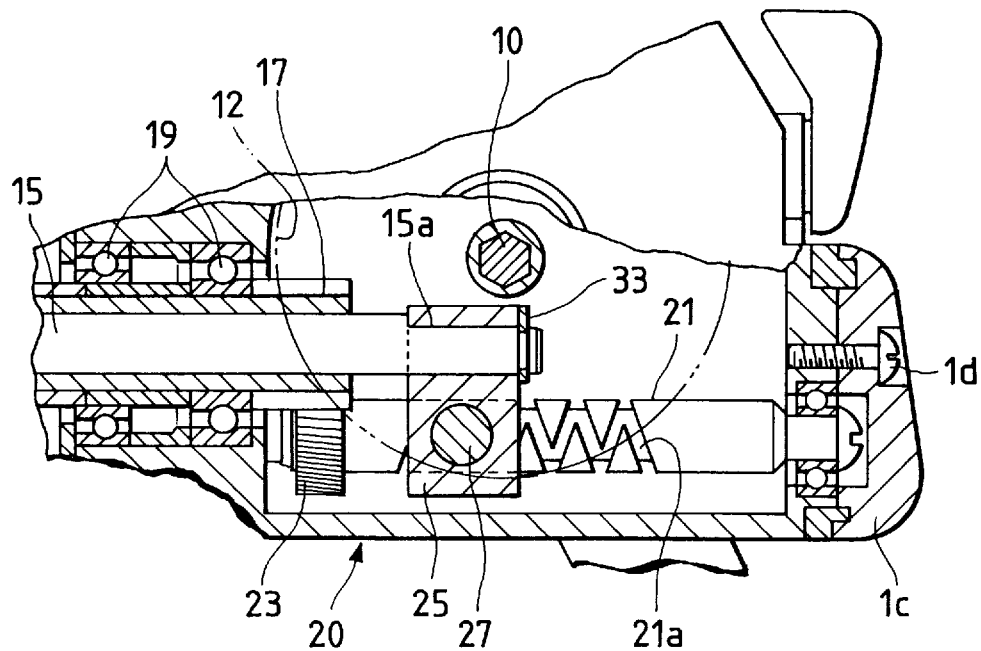
FIG. 5 is a diagram for a description of another example of the method for fixing the spool shaft to the slider in the spool reciprocating mechanism.

The securing of the spool shaft 15 to the slider 25 can be achieved, for instance, as shown in FIG. 4 or 5. In the case of FIG. 4, an opening l*a* is formed in the upper surface of the rear portion of the reel body 1. The spool shaft 15 is secured to the slider 25 with the screw 30 driven through the opening 1*a*. Thereafter, a cap 1*c* is fitted on the reel body 1 through a washer 1*b*, and the cap 1*c* is fixed with a screw 1*d* to close the opening 1*a*. In the case of FIG. 5, the non-circular part 15*a* of the spool shaft 15 is inserted into the slider 25, and a retainer 33 is set so that the spool shaft 15 may not detach from the slider 25. As is seen from the above description, the methods of securing the spool shaft 15 to the slider 25 may be changed in various manners and are not limited to the methods shown.

As was described above, the spool shaft 15 is supported in the reel body 1 in such a manner that its non-circular part 15*a* is confronted with the handle shaft 10, and the slider 25 is fixed under this condition. Hence, the spinning reel of the invention is free from the difficulty that the wall of the engaging portion 25*a* of the slider 25 is interposed between the spool shaft 15 and the handle shaft 10. Therefore as best shown in FIGS. 1–4 the gap G1 between the spool shaft 15 and the handle shaft 10 is minimized.

In the above-described embodiment, the non-circular part 15*a* of the spool shaft 15 is in the form of a slot having a flat surface, and the slider 25 has the semi-circular-groove-shaped engaging portion 25*a* in correspondence to the non-circular part 15*a*; however, the invention is not limited thereto or thereby. A feature of the invention resides in that the gap G1 between the spool shaft 15 and the handle shaft 10 is minimized. Therefore, if the configuration of the non-circular part 15*a* of the spool shaft 15 and the slider 25 are so designed that the gap G2 between the handle shaft 10 and the portion of the slider 25 to which the spool shaft 15 is coupled is equal to or smaller than the gap between the handle shaft 10 and the portion of the spool shaft 15, then the spool shaft 15 can be brought close to the handle shaft 10 as much as possible. That is, as long as the gap between the two components is as described above, the non-circular part and the slider may be changed in configuration in various manners, and the wall may be protruded towards the handle shaft. The above-described term "equal to or smaller than" is intended to include "substantially equal to".

Figure 6:
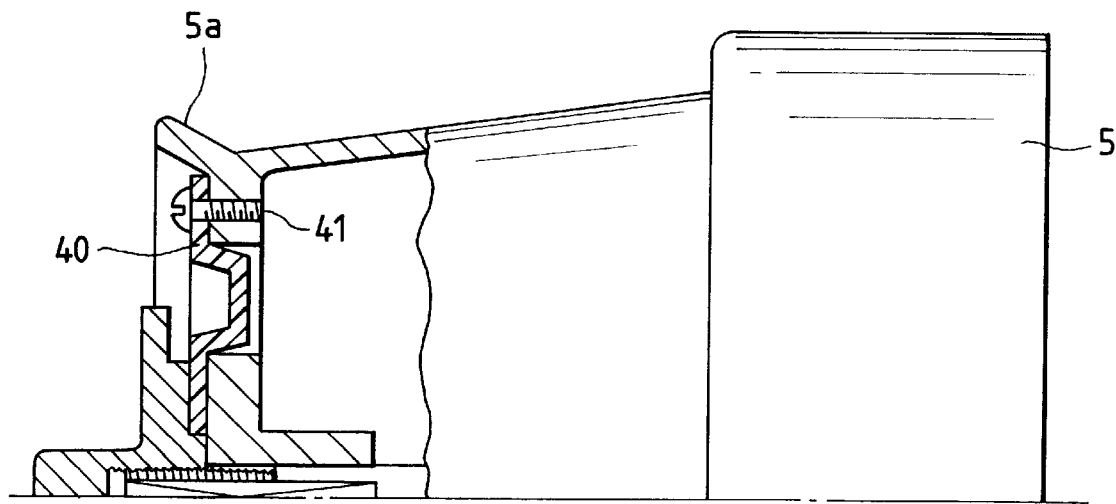
FIGS. 6 and 7 are diagrams showing examples of a sound muffling member secured to the front end portion of the spool shown in FIG. 1.
Figure 7:
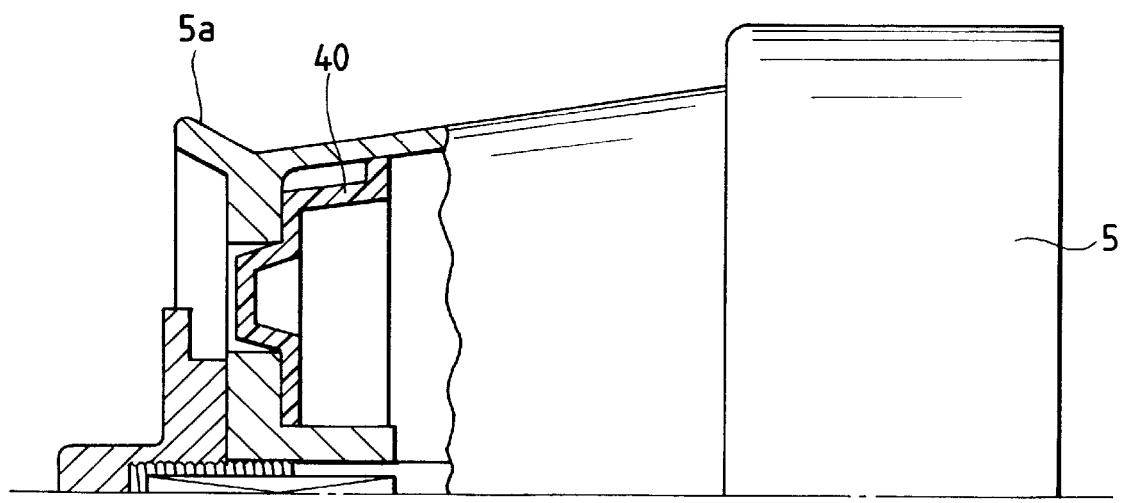

In the embodiment, the spool 5 shown in FIG. 1 may be designed as follows:

The spool 5 is made of a metal such as aluminum. Hence, when the fishing line is let out, it is brought into slide contact with the front flange 5*a*, thus producing a metallic sound. In order to decrease the volume of the metallic sound, as shown in FIG. 6 or 7, a sound muffling member 40 of resin or rubber is fixedly provided near the front flange 5*a*. In the case of FIG. 6, the sound muffling member 40 is mounted on the spool 5 with screw 41 from the front. In the case of FIG. 7, the sound muffling member 40 is mounted on the spool 5 from inside. In each of the cases, the sound muffling member 40 is in contact with the front flange 5*a* which produces a metallic sound when brought into slide contact with the fishing line. Hence, the metallic sound which may be produced when the fishing line is let out is muffled.

Figure 8:
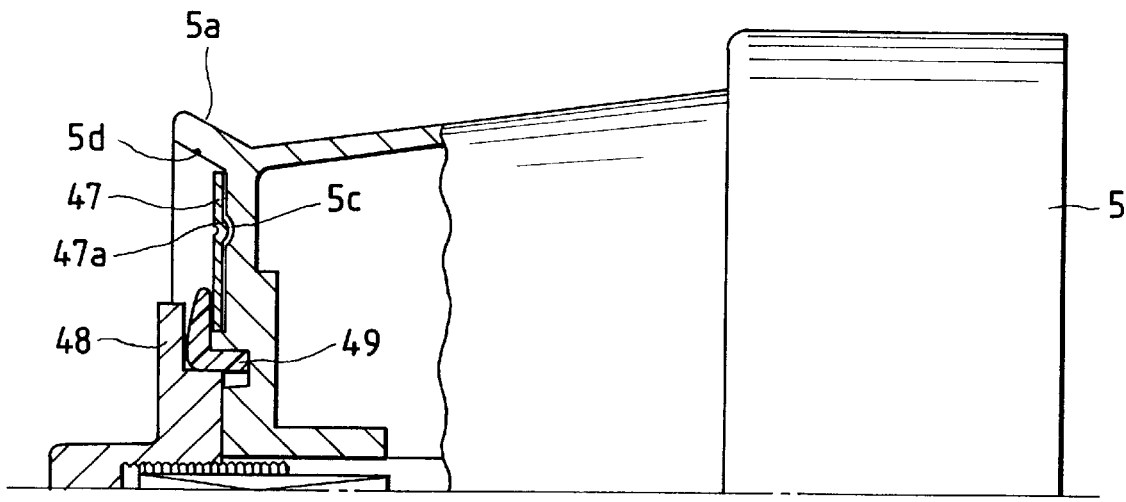
FIG. 8 is a diagram showing line indicating means provided on the front end portion of the spool shown in FIG. 1.
Figure 9:
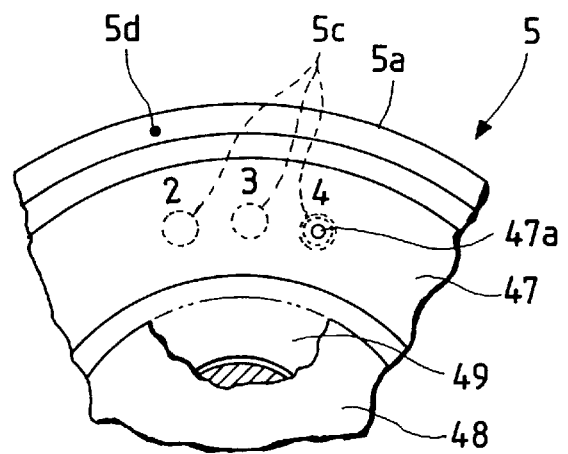
FIG. 9 is a front view of the line indicating means shown in FIG. 8.

As shown in FIGS. 8 and 9, line indicating means for indicating the diameter of a fishing line wound on the spool 5 is provided on the front end face of the spool 5. The line indicating means is designed as follows: That is, an annular scale board 47 having numerals is rotatably supported on the front end face of the spool 5 with the aid of a cap 48 and a retaining member 49. The scale board 47 has a protrusion 47*a* on its rear surface, while the spool 5 has recesses 5*c* in the front end face which are engaged with the protrusion 47*a*. The scale board 47 is mounted on the front end face of the spool in such a manner that it is turned with angular intervals. The spool 5 has an indicator 5*d* on the rear surface of the front flange 5*a*, so that as the scale board 47 is turned, the diameter of the fishing line wound on the spool 5 can be indicated.

As is apparent from the above description, in the fishing spinning reel according to the invention, the distance between the spool shaft and the handle shaft is minimized. This feature makes it possible to reduce the size and the weight of the reel body, and improves the power transmission efficiency transmitting the drive power provided by the rotation of the handle. Hence, with the fishing spinning reel, the fishing line can be smoothly wound on the spool.

While the invention has been described in connection with the preferred embodiments, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A fishing spinning reel comprising:

a handle shaft with a handle, said handle shaft defining a rotational axis of said handle shaft;

a spool shaft having a non-circular part at one end thereof and mounting a spool at the other end, said non-circular part defining a flat surface; and a spool reciprocating mechanism with a slider, said slider converting rotation of said handle shaft into a linear reciprocating motion of said spool shaft, wherein said slider is non-rotatably retained to said non-circular part of said spool shaft through said flat surface, said flat surface extending substantially parallel to said axis of said handle shaft.

2. A fishing spinning reel according to claim 1, wherein said non-circular part of said spool shaft is substantially semi-circular in section.

3. A fishing spinning reel according to claim 1, wherein said slider is fixedly secured to said spool shaft with a screw screwed in said flat surface of said spool shaft.

4. A fishing spinning reel comprising:

a handle shaft with a handle, said handle shaft defining a rotational axis of said handle shaft;

a spool shaft having a non-circular part at one end thereof and mounting a spool at the other end, said non-circular part defining a recessed surface, a spool reciprocating mechanism with a slider, said slider converting rotation of said handle shaft into a linear reciprocating motion of said spool shaft, wherein said slider is non-rotatably retained to said non-circular part of said spool shaft through said recessed surface, said recessed surface of said non-circular part confronting said axis of said handle shaft.

* * * * *